United States Patent
Siddarth et al.

(10) Patent No.: US 11,523,010 B2
(45) Date of Patent: Dec. 6, 2022

(54) METHODS AND SYSTEMS FOR MANAGING CANCELLED JOBS AT A MULTI-FUNCTION DEVICE

(71) Applicant: XEROX CORPORATION, Norwalk, CT (US)

(72) Inventors: Jaya Siddarth, Chennai (IN); Sowjanya Mahendran, Madurai (IN); Saranya Bharathi, Chennai (IN); Dara N Lubin, Pittsford, NY (US); Srinivasarao Bindana, Kakinada (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/235,025

(22) Filed: Apr. 20, 2021

(65) Prior Publication Data
US 2022/0337712 A1    Oct. 20, 2022

(51) Int. Cl.
*H04N 1/00* (2006.01)
(52) U.S. Cl.
CPC ..... *H04N 1/00344* (2013.01); *H04N 1/00244* (2013.01); *H04N 1/00477* (2013.01); *H04N 1/00482* (2013.01); *H04N 2201/0094* (2013.01)
(58) Field of Classification Search
None
See application file for complete search history.

(56) References Cited

U.S. PATENT DOCUMENTS

| 8,384,941 | B2* | 2/2013 | Ciriza | G06F 1/3203 |
| | | | | 358/1.15 |
| 8,724,134 | B2 | 5/2014 | Jones | |
| 2010/0145647 | A1* | 6/2010 | Bouchard | G06F 11/0751 |
| | | | | 702/85 |
| 2011/0249290 | A1* | 10/2011 | Hayber | G06F 3/121 |
| | | | | 358/1.15 |
| 2011/0255127 | A1* | 10/2011 | Suzuki | G03G 15/55 |
| | | | | 358/1.15 |
| 2013/0194607 | A1* | 8/2013 | Jones | G06K 15/002 |
| | | | | 358/1.14 |
| 2015/0036171 | A1* | 2/2015 | Harano | G03G 15/5012 |
| | | | | 358/1.14 |
| 2016/0253126 | A1* | 9/2016 | Kamma | G06F 3/1285 |
| | | | | 358/1.15 |
| 2017/0064117 | A1* | 3/2017 | Tsujita | G06F 3/1258 |

* cited by examiner

*Primary Examiner* — Henok Shiferaw

(57) ABSTRACT

The present disclosure discloses methods and systems for managing cancelled jobs at a multi-function device. The method includes receiving a request from a user to cancel a job submitted at the multi-function device. Based on the request, a user interface is provided to the user. The user interface includes one or more pre-defined options related to cancelling the job, for selection by the user. The one or more pre-defined options can be quality related option or non-quality related option. The selected pre-defined option is analyzed and based on the analysis, an admin user is notified in real-time to take an appropriate action.

19 Claims, 17 Drawing Sheets

METHODS AND SYSTEMS FOR MANAGING CANCELLED JOBS AT A MULTI-FUNCTION DEVICE

TECHNICAL FIELD

The present disclosure relates to the field of printing, scanning, and/or copying. More specifically, the disclosure relates to methods and systems for managing cancelled jobs at a multi-function device.

BACKGROUND

Sometimes a user who has submitted a job at a multi-function device cancels the job in the middle because of various reasons. For example, a user may cancel a print job if there are black stripes or smudge marks on the printed papers that leads to poor print quality. In another example, a user may cancel a scan job if the scanned job is no more required by the user. In an additional example, a user who has submitted a copy job may cancel the job as he wants to reset one or more parameters such as paper size, orientation, copy on both sides, etc.

Many a times, different users cancel their jobs for a common reason. For example, a user cancels a print job submitted at a multi-function device because of poor image quality, and a next user who is unaware of this situation may cancel his job for the same reason. Similarly, if the multi-function device is faulty and is providing black marks on scanned document, each user who is trying to scan on that device may cancel their jobs for the same reason. In an organizational setup, where team members have a busy schedule, this repetitive cancellation of jobs by different users leads to a significant waste of team's effort. Moreover, this sometimes discourages team members to use a particular multi-function device in the organization for repetitive errors/faults.

One available solution to cater to the above situation is providing a phone next to the multi-function device such that the users may dial in the number to give feedback to a service team. The service team can then come and rectify the errors in the multi-function device. However, many users are reluctant to call because they do not want to spend their time in interacting with service team to rectify the errors in the multi-function device. In some cases, the user logs a complaint about the error in the multi-function device and once the service team gets the information they come and rectify the error. However, this takes significant time. Moreover, the next users do not know and can try to print or scan while the error persists, which leads to unsatisfactory output. But there is no automated way that the previous users can inform the next users about the existing problem in the multi-function device.

Currently, there are no solutions to track the reasons for cancelled jobs. Also, there are no solutions that can automatically inform the service team about a recurring issue and/or can inform new users about an existing problem in a multi-function device. Hence, there is a need for methods and systems to solve the above-mentioned problems.

SUMMARY

According to aspects illustrated herein, a method for managing cancelled jobs at a multi-function device is disclosed. The method includes receiving a request to cancel a job submitted at the multi-function device. Based on the request, a user interface is provided to the user including one or more pre-defined options related to cancelling the job, for selection by the user, where the one or more pre-defined options include quality related option and non-quality related option. The pre-defined option selected by the user for cancelling the job is then analyzed. Based on the analysis, an admin user is notified in real-time to take an appropriate action.

According to further aspects illustrated herein, a system for managing cancelled jobs is disclosed. The system includes a multi-function device for receiving a request to cancel a job submitted at the multi-function device. Based on the request, the multi-function device provides a user interface to the user, where the user interface includes one or more pre-defined options related to cancelling the job, for selection by the user. The one or more pre-defined options include quality related option and non-quality related option. The multi-function device notifies an admin user in real time to take an appropriate action based on an analysis. The system further includes a cloud server that is communicatively coupled to the multi-function device for analyzing the pre-defined option selected by the user for cancelling the job and for sending the analysis to the multi-function device.

According to another aspect illustrated herein, a multi-function device for managing cancelled jobs is disclosed. The multi-function device receives a request from a user to cancel a job as submitted. Based on the request, a user interface including one or more pre-defined options related to cancelling the job is provided to the user, for selection by the user, where the one or more pre-defined options include quality related option, non-quality related option and others option. The multi-function device analyzes the pre-defined option selected by the user for cancelling the job and notifies an admin user in real-time to take an appropriate action based on the analysis.

According to additional aspect illustrated herein, a method for managing cancelled jobs at a multi-function device is disclosed. The method includes receiving one or more requests from one or more users to cancel their respective jobs submitted at the multi-function device. Based on the one or more cancellation requests, a user interface including one or more pre-defined options related to cancelling their respective jobs is provided to the users for selection. The pre-defined options include quality related option and non-quality related option. Based on the respective pre-defined option selected by the one or more users, the selected pre-defined option is sent to an analytical model for further analysis. Based on the analysis, an admin user is allowed to track a primary reason for the one or more users for cancelling their respective jobs at the multi-function device and to take an appropriate action.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
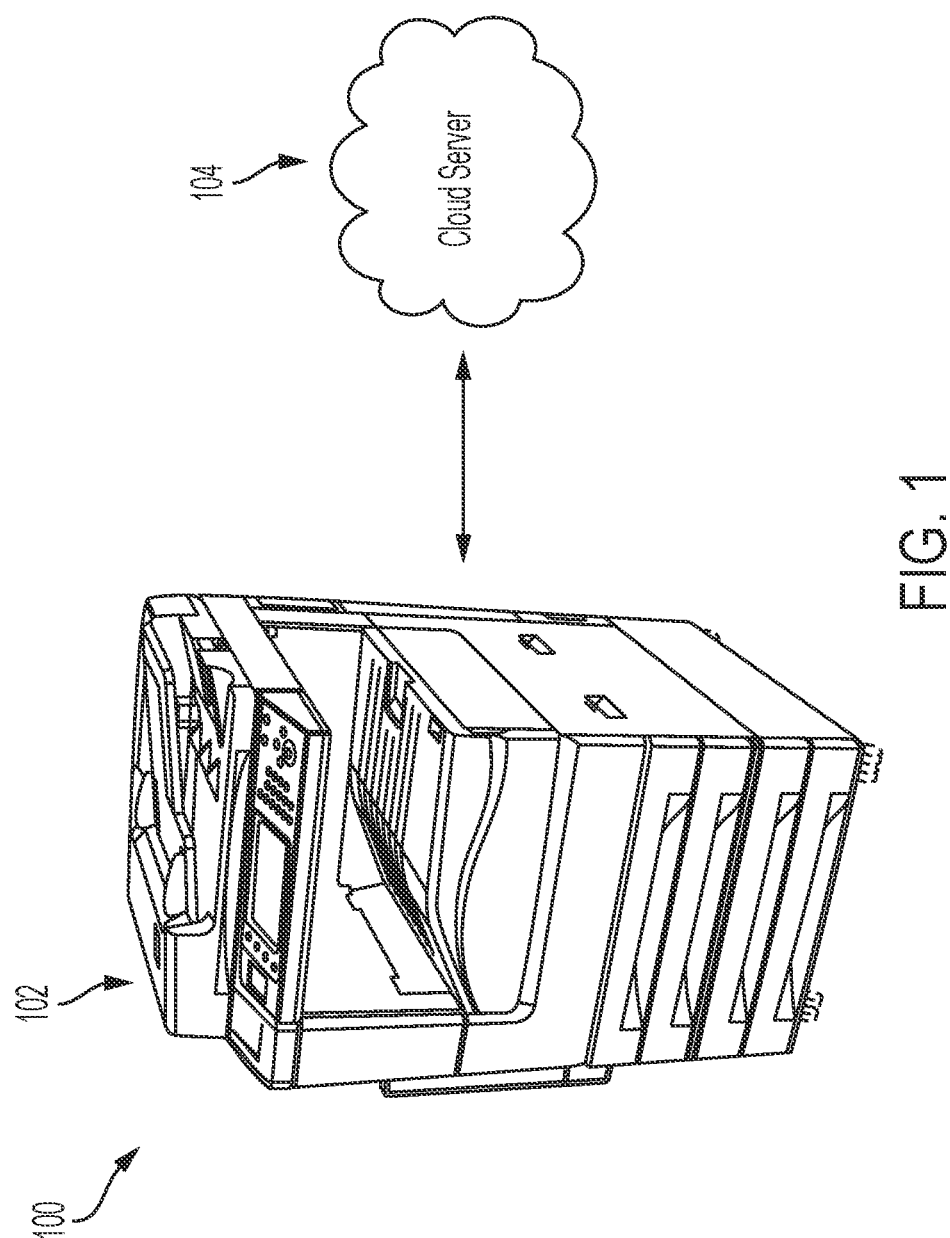
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" refers to a single device or a combination of devices configured to perform one or more functions such as, but not limited to, printing, imaging, scanning, copying, and so on. The multi-function device may include software, hardware, firmware, and a combination thereof. In the context of current disclosure, the multi-function device manages one or more cancelled jobs such that the multi-function device allows one or more users to provide one or more reasons to cancel their respective job. These reasons are further analyzed, and based on the analysis, an admin user can take an appropriate action in real-time or otherwise at later stages.

The term "job" includes a print job, a scan job, a fax job, a copy job, or a combination thereof. The job includes a document having one or more pages and is associated with one or more job attributes. The job can be submitted by a user either via a computing device or directly at the multi-function device. The user may user a print driver installed on the computing device to submit the job, whereas the user may plug in a USB to submit the job directly at the multi-function device. If the job is a print job, digital version of the document is submitted. If the job is a scan job, a printed version of a document is submitted at the multi-function device. If the job is a copy job, a printed version of a document is submitted at the multi-function device.

The term "cancelled job" refers to an incomplete/pending job at the multi-function device once cancellation of the job is received. The job is cancelled either by the user or automatically by the multi-function device. The job can be cancelled both before and during execution. In context of the present disclosure, the user cancels the job during execution for one or more pre-defined options/reasons.

The term "one or more pre-defined options" refers to a list of options that are shown or displayed to the user while cancelling a job. Each option indicates a reason of cancelling the job. The pre-defined options are displayed once the user submits a job cancellation request. The pre-defined options can vary based on the type of cancelled job. For example, options displayed for cancelling a print job may be different to the options presented while cancelling a scan or a copy job. The user can select more than one option as a reason to cancel the job. The pre-defined options can be quality related options and non-quality related options.

The term "quality related option" refers to an option that is related to the quality of the job. The user selects one or more quality related option if the submitted job is not of desired quality. Exemplary quality related options can be smudge marks, unwanted stripes, ghosting, unwanted marks, unwanted dots, repeated jamming of paper, poor image quality, low resolution, and insufficient consumables.

The term "non-quality related option" refers to an option that is not related to the quality of the job. The user may choose to select one or more non-quality related option when he wishes to change one or more job parameters or setting. For example, the user may choose the non-quality related option if he wishes to change print parameters such as page setup, resolution, color, and so on. Some exemplary non-quality related options can be wrong document selection and wrong media selection.

The term "appropriate" refers to a suitable or an apt action that an admin user takes based on the analysis of the pre-defined option that is selected by the user for job cancellation. Exemplary appropriate actions that can be taken by the admin user includes going to the multi-function device to fix the reason for job cancellation, notify one or more users about the reason so that these users can use some other multi-function device till the error in the device is fixed, automatic cancellation of any new jobs submitted at the multi-function device till the reason for cancellation is fixed, and so on.

Overview

The present disclosure discloses methods and systems for managing cancelled jobs submitted at a multi-function device. More specifically, the methods and systems propose a new feature that allows a user to select one or more reasons to cancel the job submitted at the multi-function device. The reasons are then stored at a cloud server, where the reasons are analyzed. Based on analysis of one or more reasons, an admin user is notified to take an action in real-time such as to rectify the reason behind job cancellation, provide real-time support in fixing the reason, and so on. The proposed methods and systems also provide alert to new users about an existing problem in the multi-function device, which saves time of these users as they can use another multi-function device for submitting their jobs.

Exemplary Environment

FIG. 1 shows an exemplary environment 100 in which various embodiments of the disclosure can be practiced. The environment 100 includes a multi-function device 102 capable of performing one or more functions such as printing, copying, scanning, faxing, and so on. Various examples of the multi-function device 102 may be a printer, a multi-function peripheral device, or the like. The multi-function device 102 may be communicatively coupled to a cloud server 104 through a communication network. The multi-function device 102 and the cloud server 104 collectively forms a system.

A user uses the multi-function device 102 for his day-to-day tasks such as printing, copying, emailing, scanning, or faxing functionalities. In context of the present disclosure, the multi-function device 102 manages one or more cancelled jobs. The multi-function device 102 receives a request to cancel a job from a user. The job can be a print job, a scan job, or a copy job. And the user cancels the job while it is in progress. The user may wish to cancel an ongoing job for number of reasons including, but not limited to, wrong job submitted, poor quality, need to change one or more job parameters, and so on.

Upon receiving the job cancellation request, the multi-function device 102 provides a user interface including one or more pre-defined options related to cancelling the job. The multi-function device 102 allows the user to select one or more pre-defined options, where the one or more pre-defined options indicate a reason to cancel the job by the user. Broadly, the one or more pre-defined options include quality related option, non-quality related option, and others option. The quality related options can be repeated jamming of paper, poor image quality, insufficient consumables, smudge marks, unwanted marks, ghosting, unwanted stripes, unwanted dots, low resolution, and so on. The non-quality related option can be one of—wrong document selection or wrong media selection, etc. These are just a few examples and the one or more pre-defined options can include any suitable option that indicates a reason to cancel the job by the user such as cover of platen or trays are not properly closed, etc. The selected pre-defined option is then stored at the cloud server 104 for analysis. The cloud server analyzes the pre-defined option and notifies an admin user to take an appropriate action in real-time based on the analysis.

In the environment 100 of FIG. 1, the job cancellation request is raised by the user directly at the multi-function device 102. As a result, the pre-defined options are presented via a user interface of the multi-function device 102. However, the user may raise the job cancellation request via a computing device (although not shown) such that the pre-defined options are displayed via a user interface of the computing device. In both the cases, the selected pre-defined option is stored at the cloud server 104 for further analysis.

Exemplary System

Figure 2:
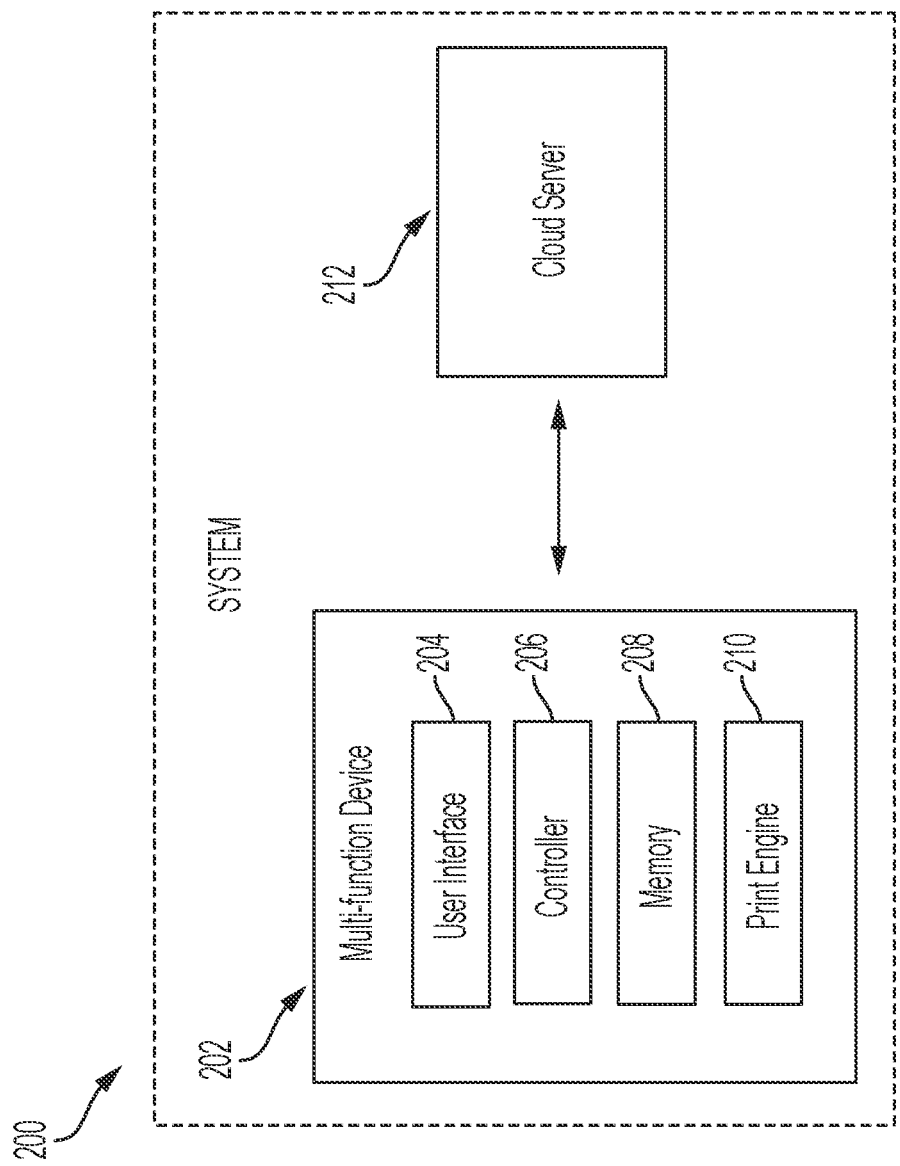
FIG. 2 is a block diagram illustrating various components of a system including a multi-function device and a cloud server, in accordance with an embodiment of the present disclosure.

FIG. 2 illustrates a block diagram of a multi-function device 202 for implementing the current disclosure. As illustrated, the multi-function device 202 includes a user interface 204, a controller 206, a memory 208, and a print engine 210. The components 204-210 are connected to each other via a conventional bus or a later developed protocol. And the components 204-210 communicate with each other for performing various functions of the present disclosure. The multi-function device 202 may further include additional component(s) as required to implement the present disclosure. The multi-function device 202 may perform functions and operations similar to the multi-function device 102 of FIG. 1.

Further, the multi-function device 202 is communicatively coupled to a cloud server 212 via a communication network (although not shown) to perform various tasks such as sending user selected pre-defined reason for cancelling a job, or other tasks required for implementing the current disclosure. The communication network may be a wireless network, a wired network, or a combination thereof. The communication network may be implemented as one of the different types of networks such as Intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

In operation, a user wishes to cancel a job that is already submitted at the multi-function device 202. The job can be a print job, a scan job, a copy job, or a fax job. For easy discussion, the job submitted by the user is a print job and he wants to cancel the job while the job is in progress. It can be considered that the user wishes to cancel the print job in progress for one or more reasons such as print quality of the printed pages is poor, repeated paper jamming, and so on.

Figure 3A:
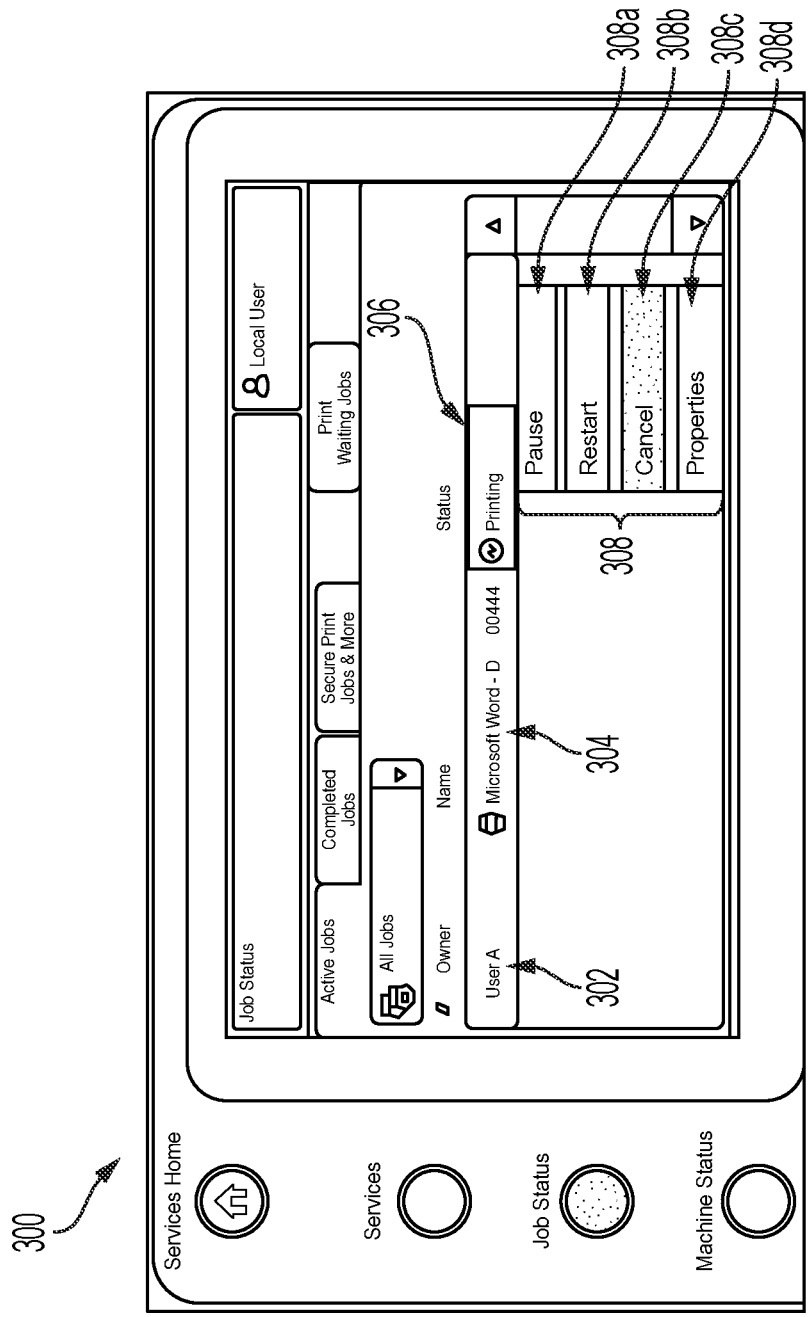
FIGS. 3A-3G are exemplary snapshots of user interfaces presented on a multi-functional device and/or a computing device, in accordance with an embodiment of the present disclosure.
Figure 3B:
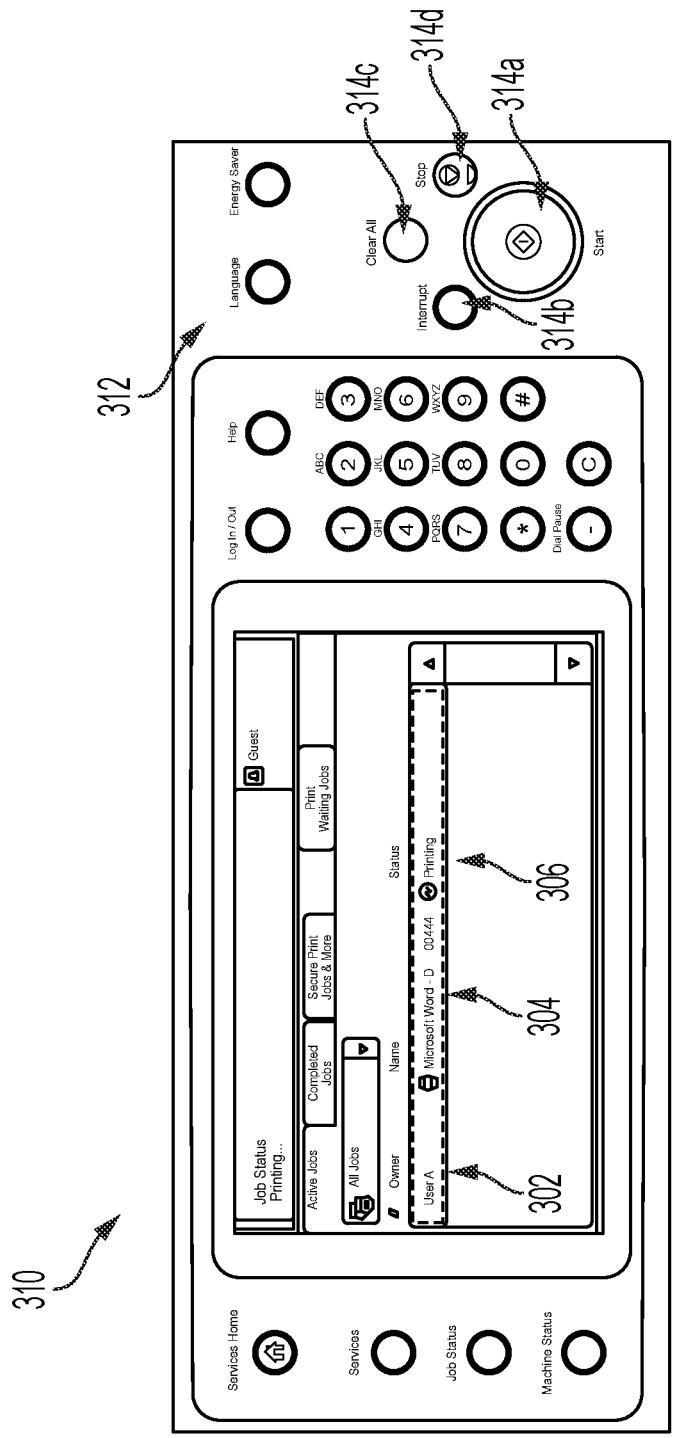
Figure 3C:
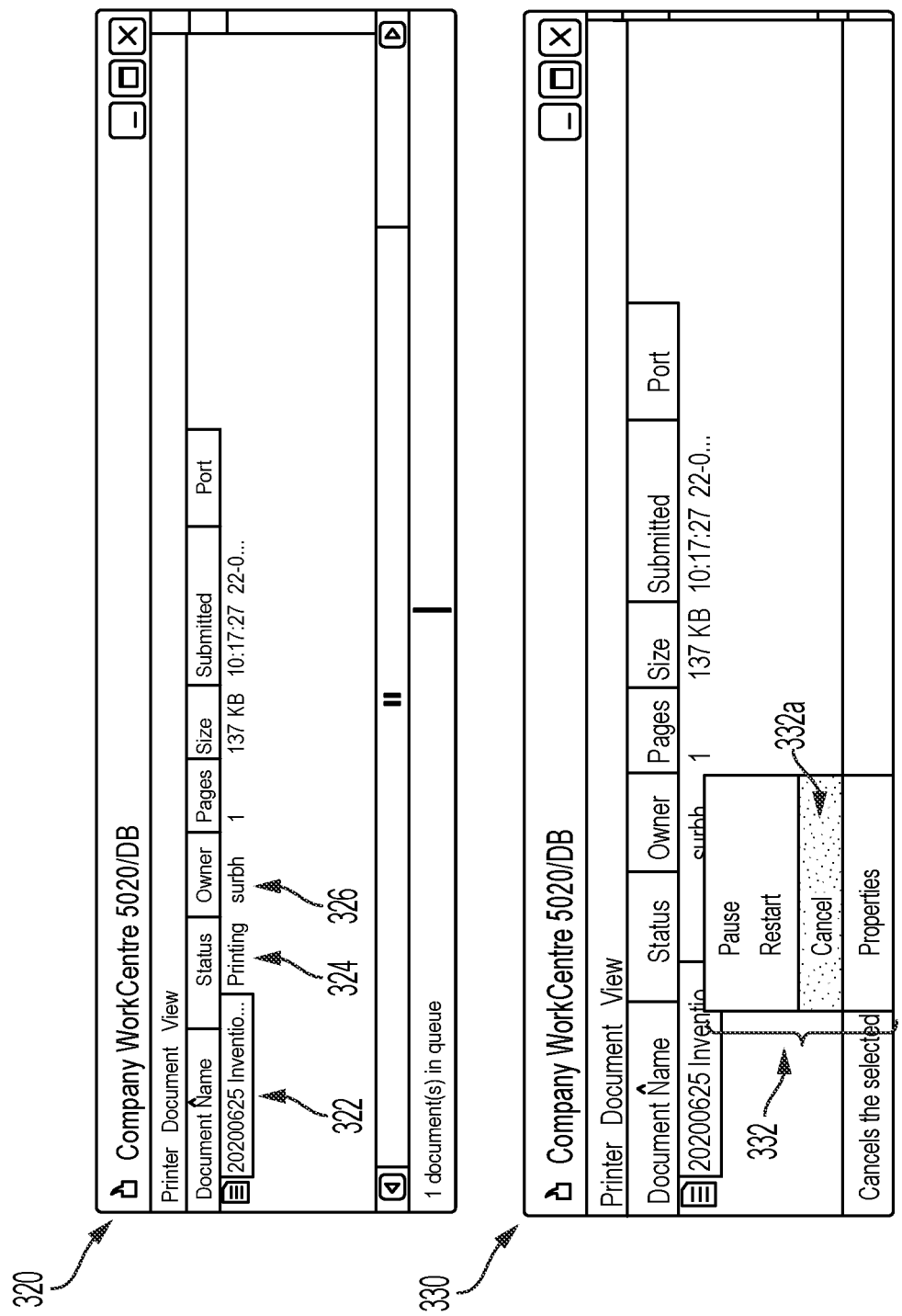

For cancelling the job, the user submits a request to cancel the job. The user can submit the job cancellation request either using his computing device or directly at the multi-function device 202. In the former scenario, the user uses an application such as a print driver running on the computing device to cancel the job. In the later scenario, the user cancels the job via the user interface 204 of the multi-function device 202. For the sake of clarity, exemplary user interfaces displaying options to cancel a print job in progress are shown in FIGS. 3A-3C. Specifically, FIGS. 3A and 3B are user interfaces presented to a user where he is cancelling the print job at the multi-function device 202, whereas FIG. 3C is a user interface presented to another user where he is cancelling a print job at his computing device. The user interface 300 of FIG. 3A provides details of a print job 304 under progress. The print job 304 is a 'Microsoft Word—D' document that is submitted by a user 'user A' 302. The job is under printing (marked as 306) when the user 302 wishes to cancel the print job 304 for one or more above discussed reasons. User A 302 right clicks on the print job 304. Upon clicking, he is presented with a list of options 308 including pause 308a, restart 308b, cancel 308c, and properties 308d. User A 302 clicks on the option 'cancel' 308c to cancel the print job 304. FIG. 3B shows another exemplary user interface 310, where the user 302 cancels the job 304 in progress directly through a control panel 312 of the multi-function device. As shown, the control panel 312 includes multiple buttons 314 including 'Start' 314a, 'Interrupt' 314b, 'Clear All' 314c, and 'Stop' 314d buttons. The user clicks on the 'Stop' 314d button to cancel the print job 304 in progress. These are just a few examples and the user interface 204 of the multi-function device 202 may provide any suitable options to cancel the job under progress. Further, the user may cancel a job in progress via his computing device such as a laptop, mobile device, etc. One such example is shown in FIG. 3C, where a user interface 320 is presented on a laptop of a user who wishes to cancel a print job in progress. As shown, the user interface 320 includes a print job 322 that is submitted by a user 'surbh' 326 and has a status 'printing' 324. The user 'surbh' 326 right clicks on the job 322. Upon clicking, another user interface 330 is presented that provides a list of options 332 for user's selection. As shown, the user clicks on a 'cancel' option (marked as 332a) to cancel the job at any moment.

Once the user successfully submits the job cancellation request, the request is received by the controller 206. The controller 206 then presents one or more pre-defined options to the user via the user interface 204, for his selection. The one or more pre-defined options indicate one or more reasons to cancel the job. For instance, the pre-defined options can be a list of predominant reasons for which most of the users frequently cancel their jobs. The pre-defined options can include quality related options, non-quality related options, and other options. For example, quality related options can include reasons contributing towards poor quality of the job for which the user prefers to cancel the job. Exemplary quality related options can be smudge marks, unwanted marks, unwanted dots, unwanted stripes, jamming of paper, poor image quality, low resolution, consumables are empty, and so on. Whereas non-quality related options can indicate reasons that are not directly related to the poor quality of the job. Exemplary non-quality related options can be reasons such as wrong document selection, wrong media selection, and so on. The one or more pre-defined options can be presented as a drop-down list for selection by the user. The list also includes an 'others' option, which can be selected by the user if the provided pre-defined options does not include a reason for which the user wishes to cancel the job. In such cases, the user interface 204 may also provide a 'comments' section, where the user can provide his comments/inputs/reason for cancelling the job.

Figure 3D:
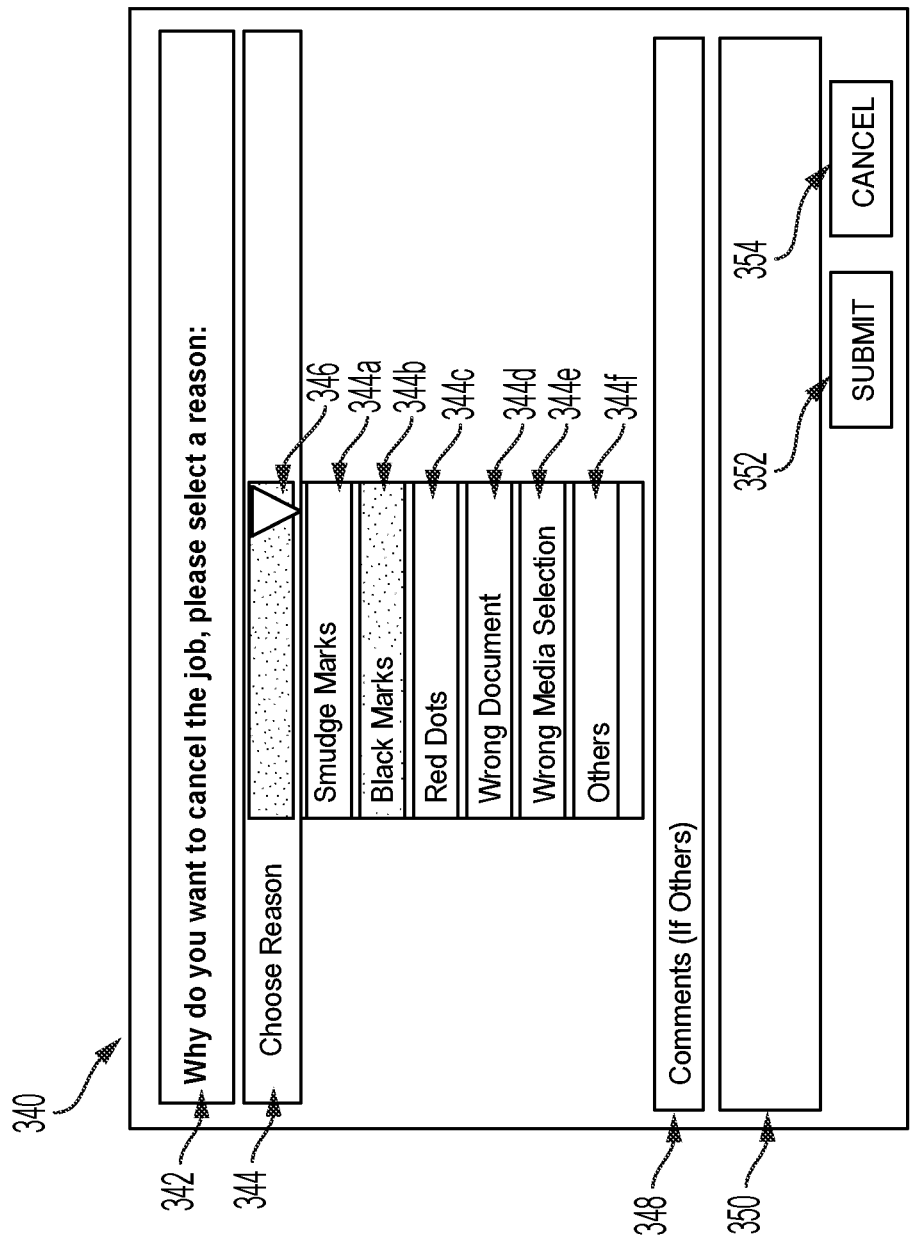

One exemplary user interface 340 providing one or more pre-defined options for user's selection is shown in FIG. 3D. As shown, the user interface 340 displays a message "Why do you want to cancel the job, please select a reason" (marked as 342) along with an option to select one or more pre-defined options (marked as 344). The one or more pre-defined options 344 can be accessed by the user by clicking on a drop-down list (marked as 346). The user clicks on the drop-down 346 to check the available one or more pre-defined options such as Smudge Marks 344a, Black Marks 344b, Red Dots 344c, Wrong Document 344d, Wrong Media Selection 344e, and Others 344f. These are just exemplary, and the user interface 340 may include any suitable number and/or type of pre-defined options that can be selected by the user as a reason to cancel his job. If the listed options 344 are not apt and does not describe the reason for job cancellation, the user selects others 344f. Upon clicking on others 344f, the user is asked to provide his comments (marked as 348) in a blank box (marked as 350). Once the user provides his comments, the user clicks on submit (marked as 352) to submit the reason for cancelling the job. The user may alternatively click on a cancel option (marked as 354) to terminate/abort the cancellation process. The user can select multiple pre-defined options as reason of cancelling the job. The user can also select one or more of the pre-defined options 344a-344e along with selecting others 344f options to provide exact reasons for cancelling the job.

The user selects an appropriate pre-defined option that indicates the reason to cancel the job by the user. For instance, if the user is cancelling the print job as one or more printed sheets include red dots, the pre-defined option selected by the user can be 'Red Dots'. In another example, if there are smudge marks on the printed papers, the user may select the pre-defined option 'smudge marks' via the user interface 204. These are just examples and the user can select more than one options to cancel the job.

Once the user submits the one or more pre-defined options as a reason to cancel the job, the options are received by the controller 206. The received options can be temporarily stored in the memory 208. Subsequently, the multi-function device 202 communicates with the cloud server 212 to store the selected options in the cloud server 212 for further analysis. In some cases, the cloud server 212 may host a database to store the selected pre-defined options related to cancellation of the job.

Along with the selected pre-defined options, the cloud server 212 may store additional information related to the cancelled job. For instance, the cloud server 212 may store user's name who cancelled the job, MAC address of the multi-function device 202, time stamp when the job is cancelled, and so on. These are just a few examples and the cloud server 212 can store additional information related to the cancelled job for further analysis.

While the above example includes a single job cancellation request. Accordingly, the reason to cancel this job is stored in the cloud server 212, but the cloud server 212 can store reasons related to all the job cancellation requests received by the multi-function device 202. In other words, each time a user cancels a job, he selects a pre-defined option indicating the reason for cancelling, which is stored in the cloud server 212. This way, the cloud server 212 stores reasons for all the jobs that are cancelled at the multi-function device 202. In addition, the cloud server 212 may store pre-defined options selected to cancel jobs submitted at one or more network multi-function devices. This way, the cloud server 212 stores pre-defined options/reasons to cancel the jobs submitted at all the connected multi-function devices for analysis.

Once stored, the cloud server 212 analyzes the pre-defined options selected by the user to cancel the job. Once analyzed, the cloud server sends the analysis back to the multi-function device such that based on the analysis, the multi-function device notifies an admin user in real-time to take an appropriate action. The details pertaining to this are discussed below.

Once the pre-defined options are sent to the cloud server 212, the cloud server 212 includes a data model and/or an analytical model to analyze the stored pre-defined option and additional information related to the cancelled job. Exemplary data/analytical models that may be employed are prescriptive, predictive, diagnostic, or descriptive models. These are just a few examples and any suitable data/analytical model can be adopted to implement the present disclosure.

During analysis, the data model segregates the pre-defined options stored in the cloud server 212. For instance, the data model segregates jobs that are cancelled for a common reason. Also, the data model may segregate the cancelled jobs received at the multi-function device 202. The data model may also segregate the jobs that are cancelled for the common reason in a pre-defined time period. For instance, if 100 jobs are cancelled at the multi-function device 202 in a day, the data model segregates if 80 of them are print jobs and further the 80 print jobs are cancelled for 4 common reasons say, smudge marks, unwanted dots, unwanted marks, and paper jamming. In addition, the additional information including user's name, MAC address of multi-function device 202 and time stamp when the job is cancelled can also be segregated. The entire analysis may provide one or more insights related to cancelled jobs that can be used by an admin user to take an appropriate action in real-time.

The admin user can be an administrator who accesses the cloud server 212, reviews the analysis, and takes an appropriate action in real-time. For example, the admin user can also analyze the submitted pre-defined options/reasons selected by different users while cancelling the jobs and see if there are any new reasons selected by users for job cancellations. For this, the admin user manually checks the comments section that includes user's comments/inputs/reasons for cancelling the job. The comments are provided by the users where the reasons for cancelling the jobs are new and not listed in the one or more pre-defined options. Based on analysis of these comments, the admin user identifies if multiple users cancelled their jobs for a same new reason. For example, if more than 10 users cancelled their print jobs for poor print quality, the admin user may add the 'poor print quality' as a new option in the list of pre-defined options. As a result, the user interface 204 is updated to include the new option in the list of pre-defined options. In some cases, the data model may automatically recommend the admin user to add one or more new reasons based on the analysis of comments provided by users. However, in other scenarios, the admin user can manually review the comments provided by one or more users at the time of job cancellations to come up with the new options to be added in the pre-defined options. This way, the analysis allows the admin user to update the one or more pre-defined options. Therefore, during any new job cancellation requests, a revised list of pre-defined options is presented to the users that includes the newly added option of 'poor print quality'.

Further, the admin user can access the cloud server 212 to set alerts and/or notifications. The admin user may select an alert option where the admin user gets notified via his computing device (e.g., mobile device, laptop) if a pre-defined number of job cancellation requests are received by the multi-function device 202. For example, the admin user may set an alert where the admin user receives a notification if a pre-defined number of jobs are cancelled for a common reason. For better clarity, an example is discussed. In this example, the admin user has set an alert where if the multi-function device 202 provides unwanted marks on printed sheets and the cloud server 212 receives 5 print job cancellation requests for this same reason in a single day, the admin user receives a notification on his mobile device. The notification may include a message "Multi-function device XP2034 is providing unwanted marks on printed sheet. Five print jobs are cancelled for this reason since morning, please fix the error on priority".

In the above scenario, the admin user can access the cloud server 212 to enable a feature where any new user receives a notification that multi-function device 202 is not in an operational state to process a print job. The notification received by new users can include a message "Multi-function device XP2034 is providing unwanted marks on printed sheet. Please use another network multi-function device till the error is fixed". This can save time and effort of any new user who is willing to print a document, as he is asked to use another device for printing. Meanwhile, the admin user can go and fix the error at the multi-function device 202. These are just a few examples and multiple alert options can be provided by the cloud server 212. Also, such alert options are customizable, and the admin user can set a new alert based on his specific requirements. Also, the cloud server 212 provides additional features. For example, the admin user may select a feature where the multi-function device 202 automatically cancels a new job that is submitted at the multi-function device 202. For instance, in cases where a pre-defined limit of job cancellation requests is received by the multi-function device 202. In such cases, a new user receives a job cancellation notification such as "There is some technical error and the Multi-function device XP2034 is not operational at the moment. Please use any other multi-function device available in the network". As a result, any new user who tries to submit a job at the multi-function device 202 gets an automatic cancellation notification.

In one example, the admin user may select a feature of providing a real-time technical support for any errors in the multi-function device 202. In such cases, if a user who has submitted his job at the multi-function device 202 cancels the job for one or more pre-defined options, the user interface 204 presents an option of providing real-time technical support. The user may select the option based on which a real-time technical support is provided. Upon selection, a back-end technical support interacts with the multi-function device 202 and tries to rectify the reason for which the user is cancelling the job. While the technical support tries to fix the reason, the user may be displayed a message via the user interface 204 such as "Please stand by while a service team member checks the multi-function device 202 and resolves the issue." The multi-function device 202 is interrogated remotely and the error is fixed, if possible. In cases where the error is not fixed remotely, the user may be displayed another message recommending him to use another network multi-function device as the error fixing requires a technical support to visit the multi-function device 202 in physical.

In another example, based on the analysis, the multi-function device 202 generates an alert for any new user about a persistent error in the multi-function device. For instance, if the analysis indicates that consecutive 5 print jobs are cancelled for a pre-defined option 'red dots', the multi-function device 202 may display an alert either via the user interface 204 or via a user interface of user's computing device. The alert indicates the user that the multi-function device 202 is not able to process any new print job for some technical error. This saves time and effort of any new user who is willing to print a document at the multi-function device 202.

Figure 3E:
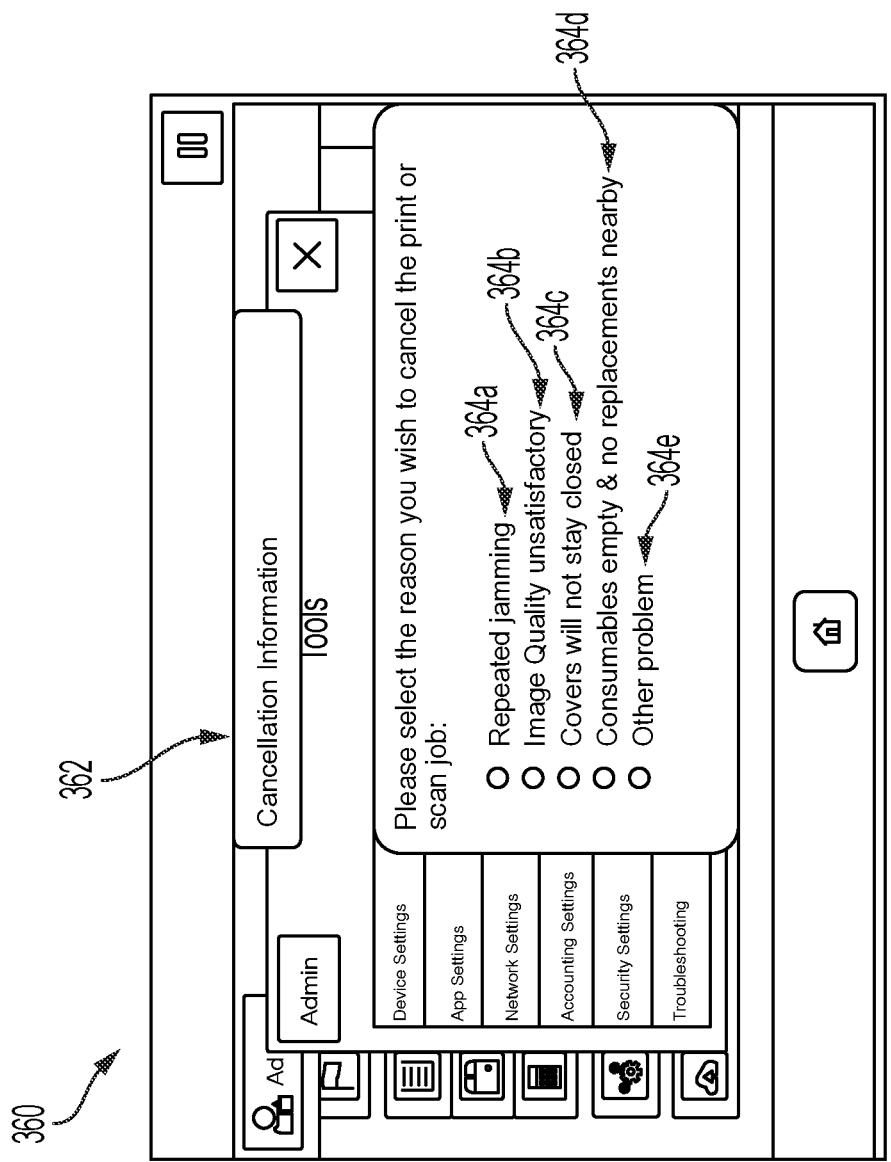
Figure 3F:
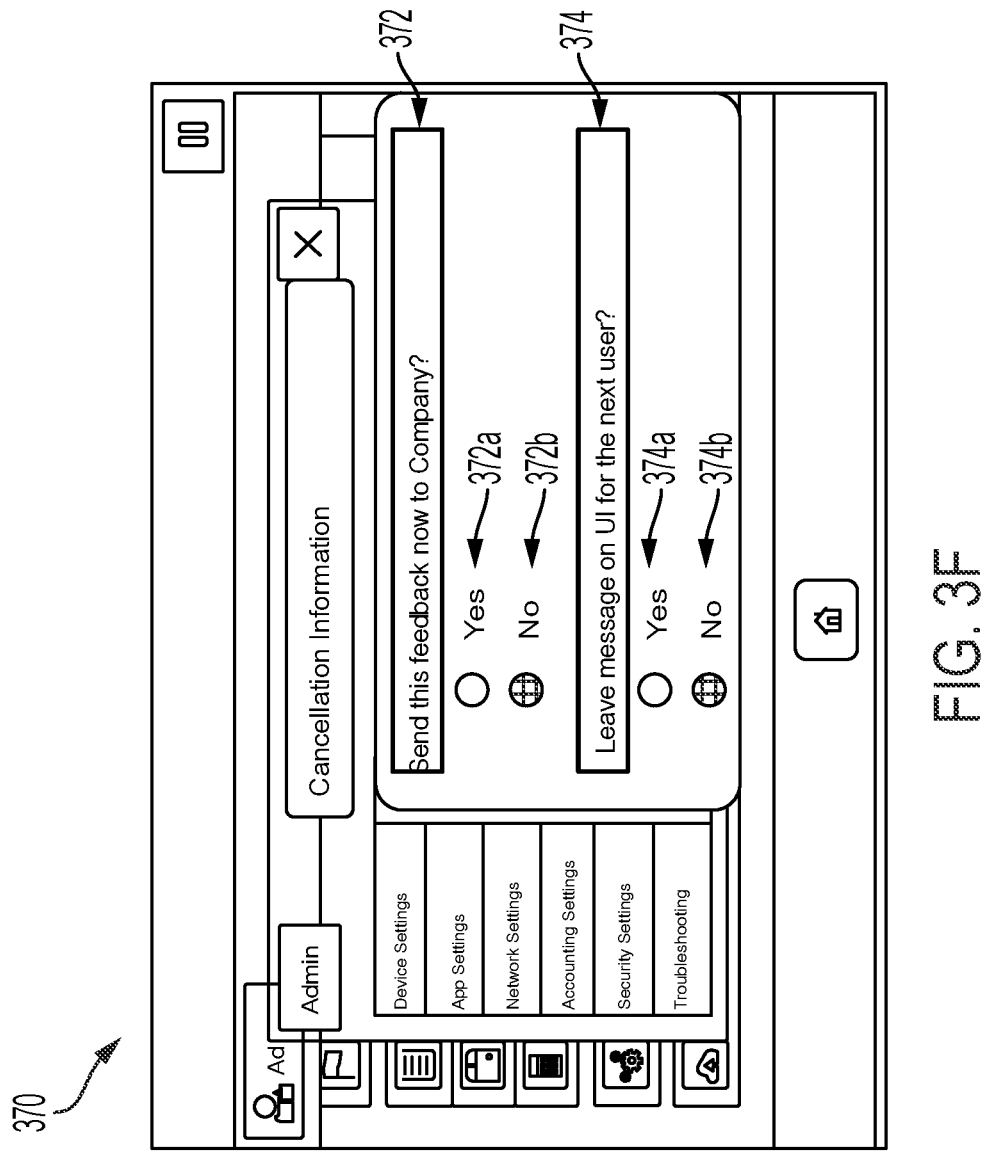
Figure 3G:
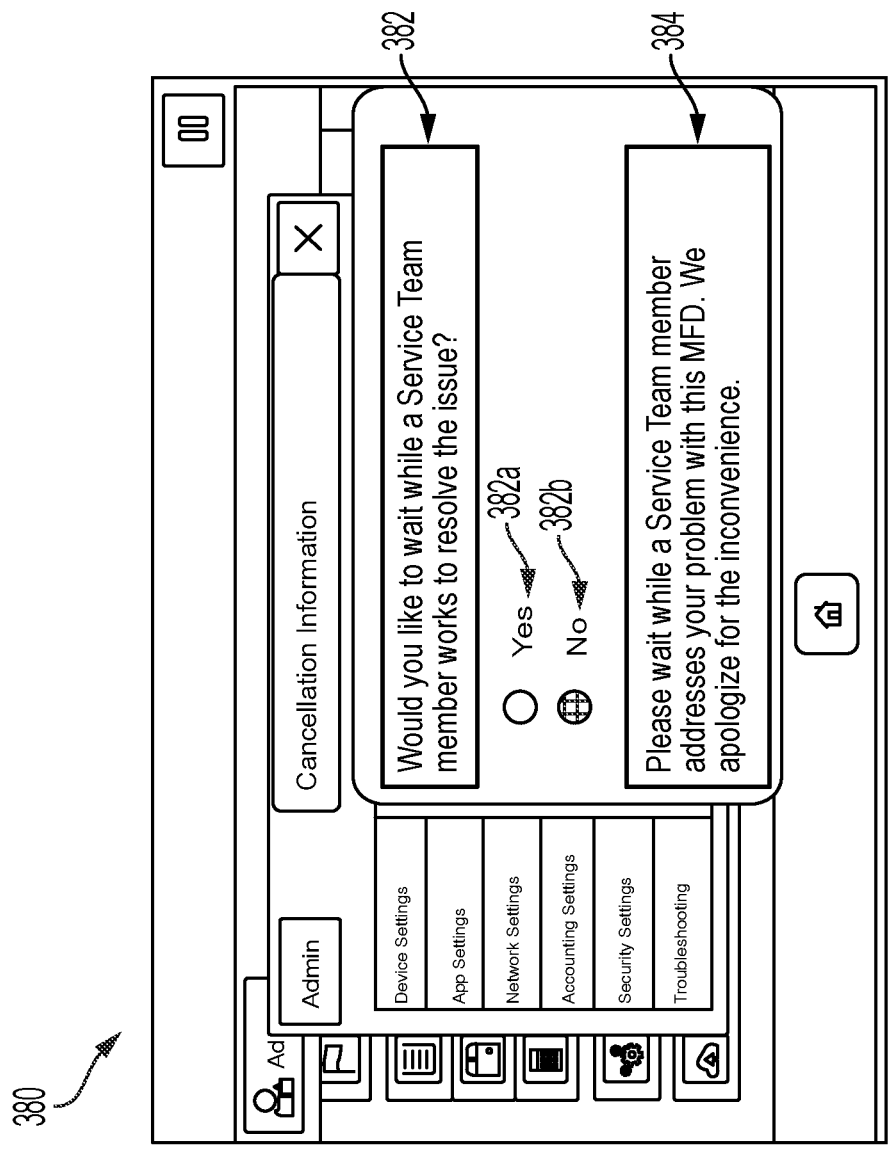

For the sake of clarity, the above scenario is depicted in FIGS. 3E-3G, where a user who is cancelling a job for one or more pre-defined options engages with a real-time technical support and if the error is not fixed, the user selects an option to leave a message for new users about the persistent error. Specifically, FIG. 3E depicts a user interface 360 that is presented to a user who has submitted a request to cancel a print job. The user interface 360 includes a list of pre-defined options 362 for user's selection. As shown, the user can select one or more options 362 from a list including— repeated jamming 364a, image quality unsatisfactory 364b, covers will not stay closed 364c, consumables empty and no replacements nearby 364d, and other problem 364e. Once the user selects one or more of the pre-defined options 362, another user interface 370 (as shown in FIG. 3F) is presented to him. The user interface 370 provides an option (marked as 372) that allows the user to send a real-time feedback to an admin user. If the user does not want to wait, he can click on 'No' (marked as 372b). Otherwise, the user clicks on 'Yes' (marked as 372a). Upon clicking on 'Yes' 372a, he is presented another user interface 380 asking him to select if he would like to wait while the service team member works to resolve the issue (marked as 382), as shown in FIG. 3G. If the user wishes to wait and resolve the issue, he selects a radio button 'Yes' (marked as 382a), else he selects another radio button 'No' (marked as 382b). In cases where the user selects 382a, a message (marked as 384) is displayed that says, 'Please wait while an admin member addresses your problem with this MFD, we apologize for the inconvenience.' As shown in FIG. 3F, the user interface 370 also presents an option (marked as 374) that allows the user to leave message on the user interface for next users. The user can click on the provided radio button 'yes' (marked as 374a) to leave the message for next user or may click to on the radio button No (marked as 374b) to cancel.

In the above discussed examples, the admin user can access the cloud server 104 or 212 of FIG. 1 or 2 via an application such as CentreWare Internet Services (CWIS). The admin user uses his login credentials to access the server via the CWIS application. It should be considered that any suitable web application can be used by the admin user to access the cloud server without departing from the scope of current disclosure.

As per the system 200 of FIG. 2 both multi-function device and cloud server are used to implement the present disclosure, where the user selected pre-defined options are sent to the cloud server for analysis. The analysis is then sent to the multi-function device and based on this analysis the multi-function device notifies the admin user in real-time to take an appropriate action. However, it can be considered that the present disclosure can be implemented standalone on a multi-function device such as the multi-function device 102 or 202 of FIG. 1 or FIG. 2, respectively. In such implementation, the multi-function device receives the request from a user to cancel a job submitted by him. Based on this request, the multi-function device provides a user interface including one or more pre-defined options related to cancelling the job. The one or more pre-defined options may be quality related options, non-quality related options or other options. The user may select one or more pre-defined options. The quality related options can be smudge marks, unwanted stripes, ghosting, unwanted marks, red dots, repeated jamming of paper, poor image quality, low resolution, and insufficient consumables. Whereas the non-quality related options can be wrong document selection and wrong media selection, etc. Once selected, the multi-function device analyzes the selected options and based on the analysis notifies the admin user in real-time to take an appropriate action such as fixing the reason for cancelling the job or providing real-time technical support, etc. The multi-function may also provide additional functionalities such as automatic cancellation of one or more received jobs based on the analysis of user selected pre-defined options, alerting the one or more other users about the cancelled jobs, and so on.

Exemplary Implementation

Figure 4A:
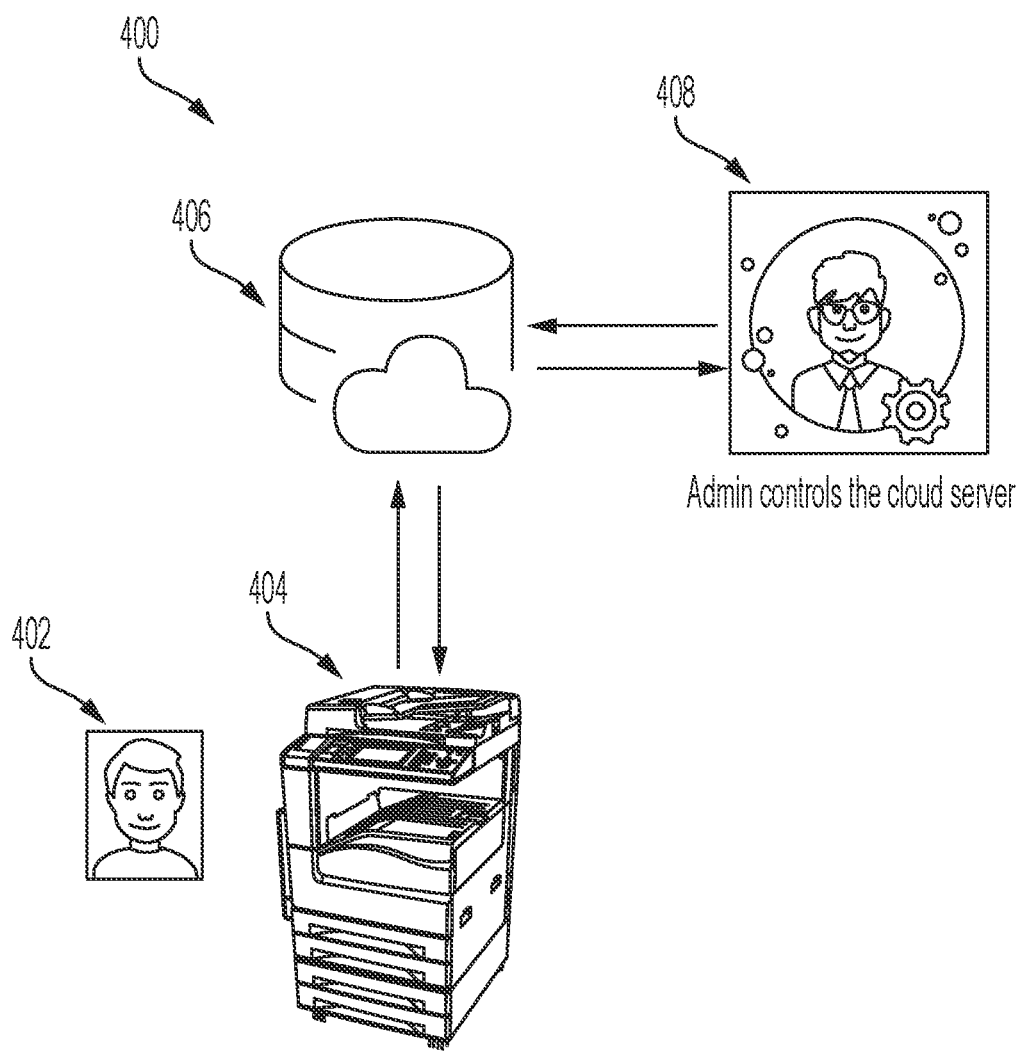
FIGS. 4A-4F show exemplary implementation of the present disclosure.
Figure 4B:
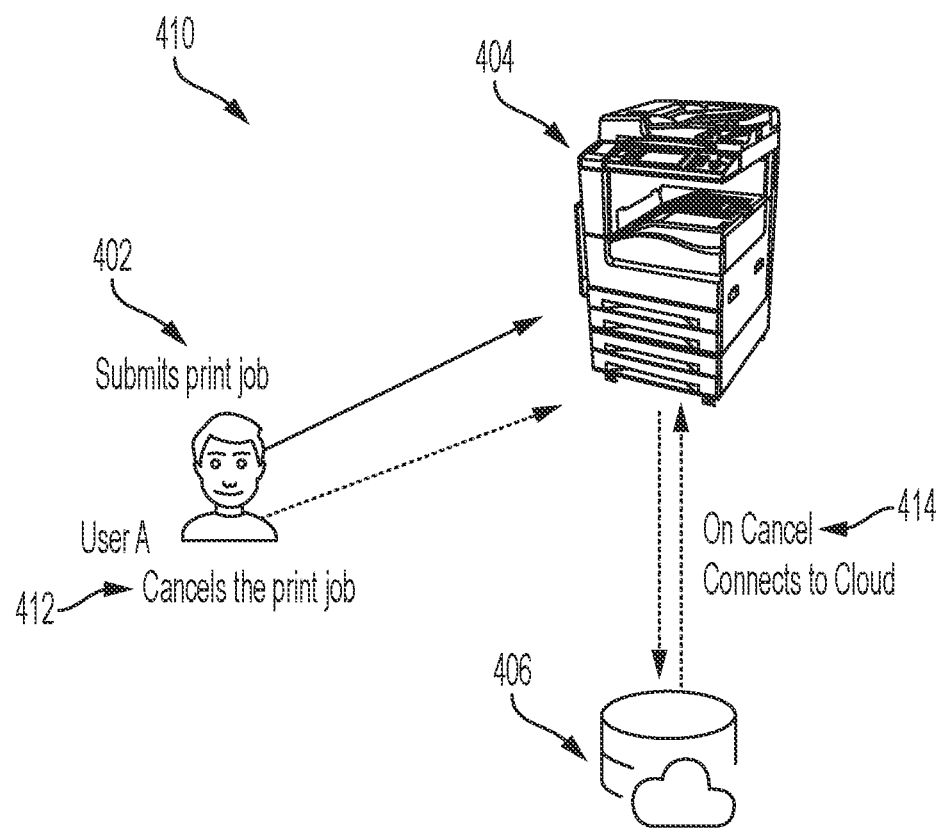
Figure 4C:
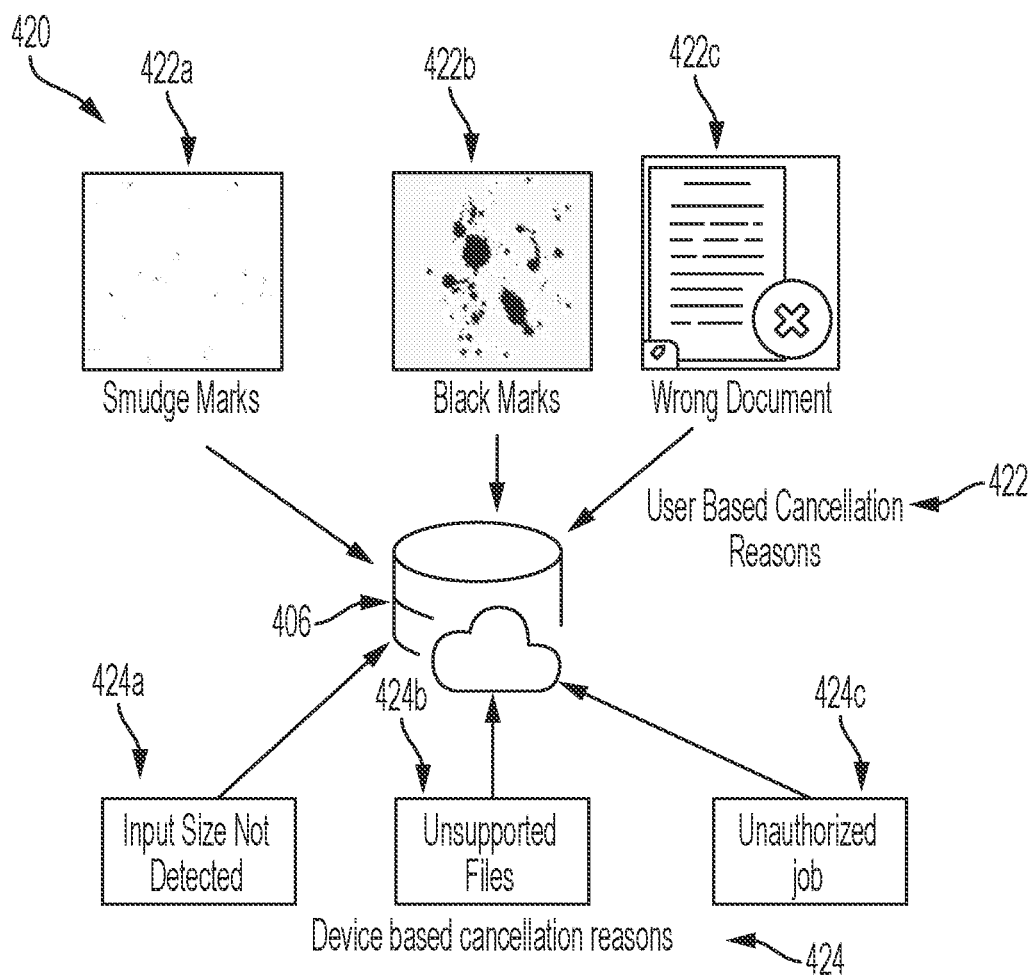

FIGS. 4A-4F show implementation of the present disclosure in an exemplary environment. As shown in FIG. 4A, the environment 400 includes a user 402, a multi-function device 404 that is communicatively coupled to a cloud server 406, and an admin user 408 who can access and control the cloud server 406.

The implementation begins when the user 402 submits a job at the multi-function device 404 for printing. Here, the user 402 inserts a USB device into a USB port of the multi-function device 404 to submit the print job. It can be considered that the user 402 may use other suitable ways to submit the print job at the multi-function device 404. For example, the user may access a cloud location via a user interface of the multi-function device 404 to submit the job or may submit the job via a print driver installed on his computing device. Once the job is submitted, the multi-function device 404 initiates printing.

Subsequently, the user 402 realizes a need to cancel the job in middle of printing for one or more reasons, as discussed previously. For example, as shown in the environment 410 of FIG. 4B, the user 402 cancels the job (marked as 412) as there are smudge marks on printed sheets. For cancelling the job, the user may click on a 'stop' button provided on a control panel of the multi-function device 404 (as shown in FIG. 3B). Other known or later developed ways to cancel the job in progress can be considered. Also, the user 402 may wish to cancel the job for one or more reasons as shown in the environment 420 of FIG. 4C. In one scenario, the user 402 may cancel his job for either user-based reasons 422 or device-based reasons 424. The user-based reasons 422 are when the user 402 manually cancels the job for reasons such as smudge marks 422a, black marks 422b, wrong document 422c, and so on. And device-based reasons 424 are when the multi-function device 404 automatically cancels a job for reasons such as input size not detected 424a, unsupported file format 424b, unauthorized job 424c, and so on. In such cases, the user who submitted the job receives an alert or notification informing him about the cancellation. The alert can be received via the user interface of the multi-function device or on user's computing device.

Figure 4D:
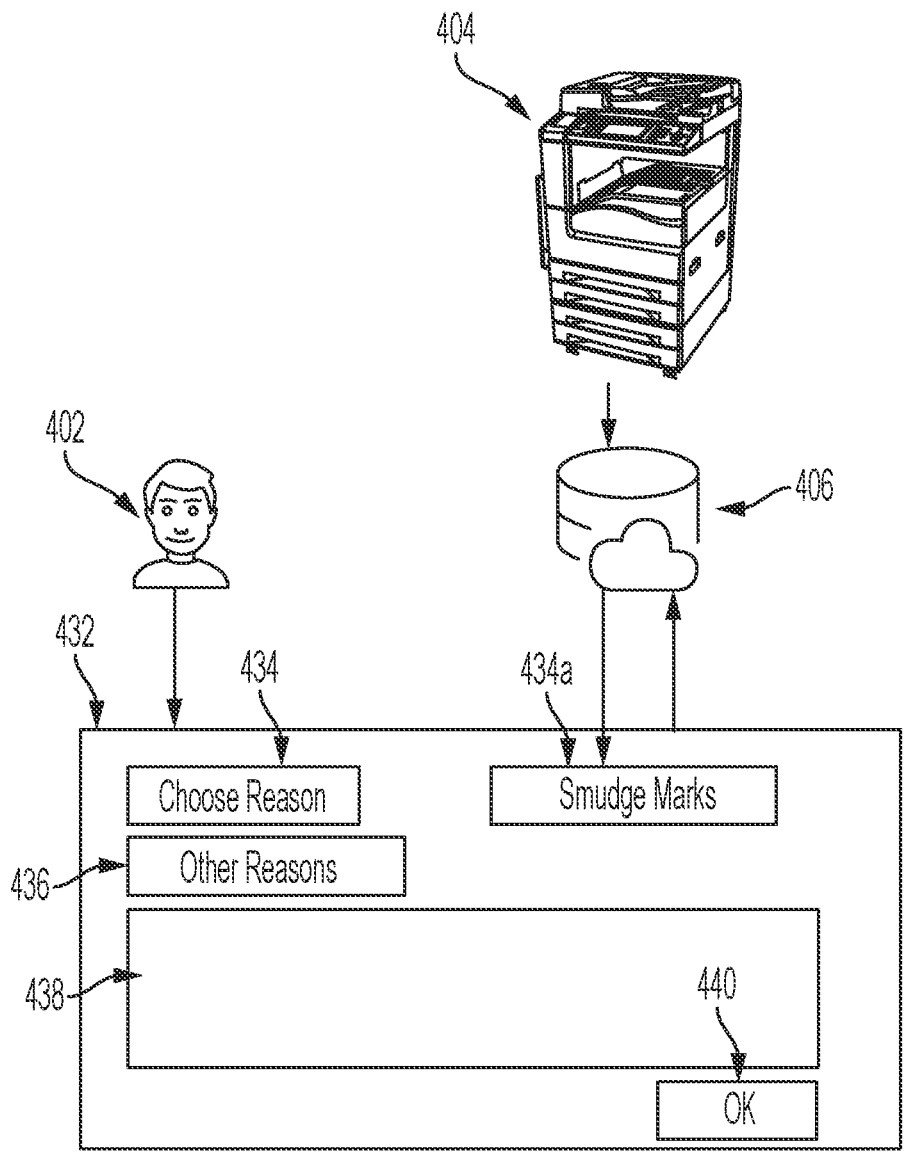

Referring back to FIG. 4B, the moment user 402 cancels the job (marked as 412), the multi-function device 404 initiates communication with the cloud server 406 (marked as 414). Eventually, the user 402 is presented a user interface 432 asking the user to select one or more reasons/pre-defined options (marked as 434) to cancel the job (as shown in FIG. 4D). In cases, where the job is automatically cancelled by the device 404, the multi-function device 404 directly sends the one or more cancellation reasons to the cloud server 406. Here, the user clicks on 'Choose Reason' 434 to select a pre-defined option/reason to cancel the job. Subsequently, the user 402 submits his reason 'Smudge Marks' 434a and clicks on 'OK' 440 to submit the reason. Upon clicking, the reason 434a is automatically stored in the cloud server 406. The user may also click on 'Other Reasons' (marked as 436) to input his specific reason in a blank box (marked as 438), in cases where the actual reason is not listed. The user 402 can also select more than one reasons to cancel the job. Once completed, the selected option/reason 434a is stored in the cloud server 406 for further analysis.

Figure 4E:
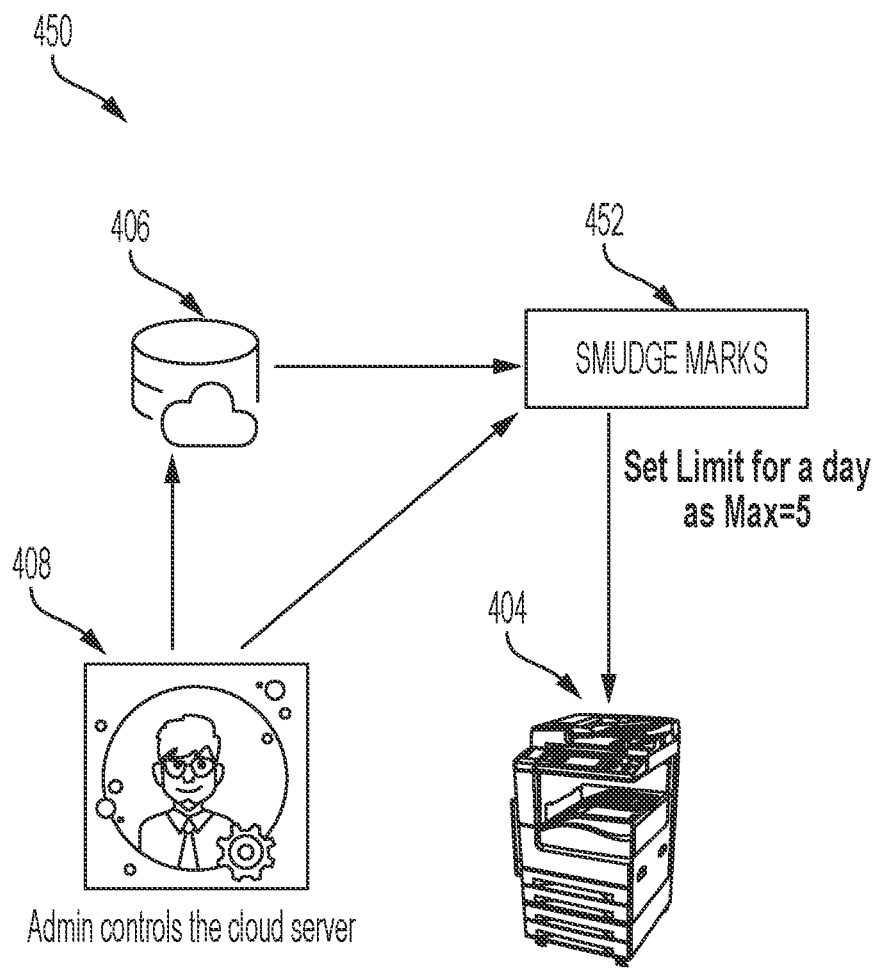

The cloud server 406 processes the submitted reason and/or feedback and shares the analysis with the multi-function device 404. Based on the analysis, the admin user 408 is notified to take an appropriate action. The notification is shared with the admin user based on some settings that are already done by the admin user 408. One such example 450 is shown in FIG. 4E, where the admin user 408 has set a limit for cancellation of jobs due to smudge marks (marked as 452) to five. Therefore, in a day, if the number of cancelled jobs for the reason smudge marks reaches the set limit of 5, the admin user 408 receives an alert/notification about the same. Based on received alert/notification, the admin user 408 can prioritize an action to go and fix the error to resolves the reason.

Figure 4F:
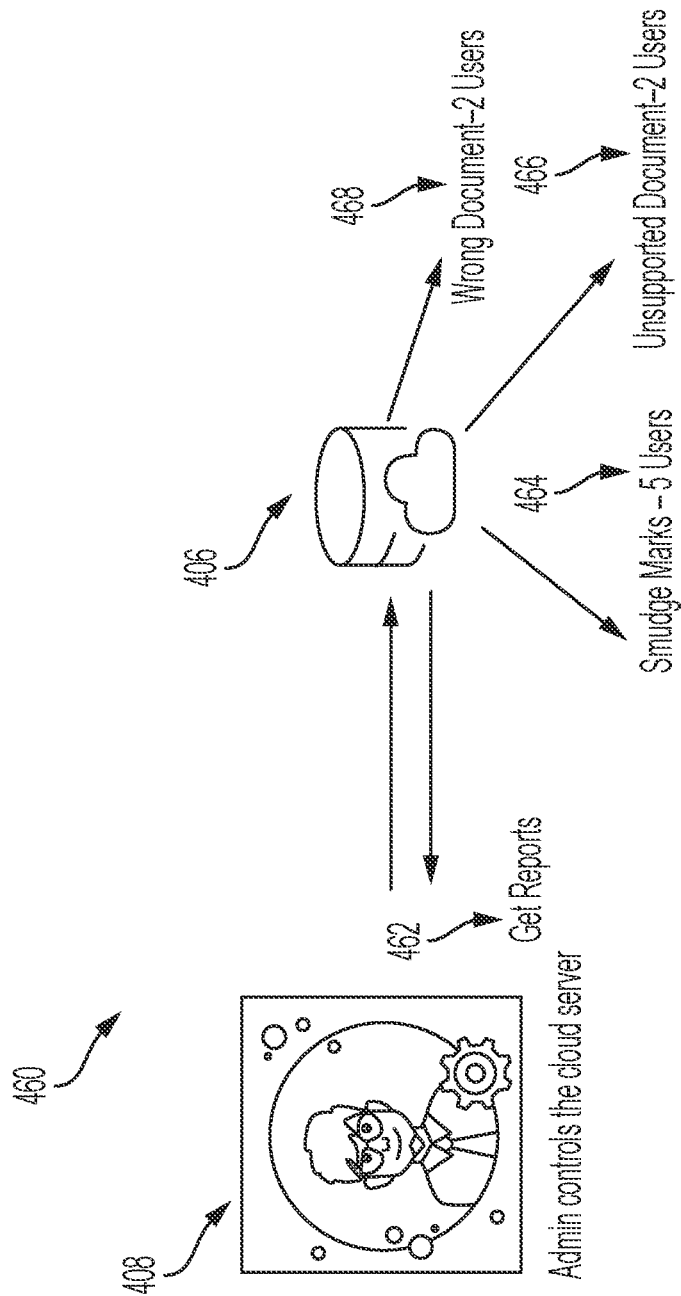

At any stage, the admin user 408 can access the cloud server 406 to analyze the stored options/reasons/feedbacks received from various users. One such exemplary scenario 460 is shown in FIG. 4F, where the admin user 408 accesses the cloud server 406 to generate reports (marked as 462). In the shown scenario 460, the report 462 indicates that five users cancelled their jobs for smudge marks (marked as 464), two jobs are automatically cancelled by the multi-function device 404 for unsupported documents (marked as 466), and two users cancelled their jobs as they shared wrong document for printing (marked as 468). The report generated can include data for one day or many days. Also, the admin user 408 can generate report that includes data for more than one multi-function device.

Exemplary Flowchart

Figure 5:
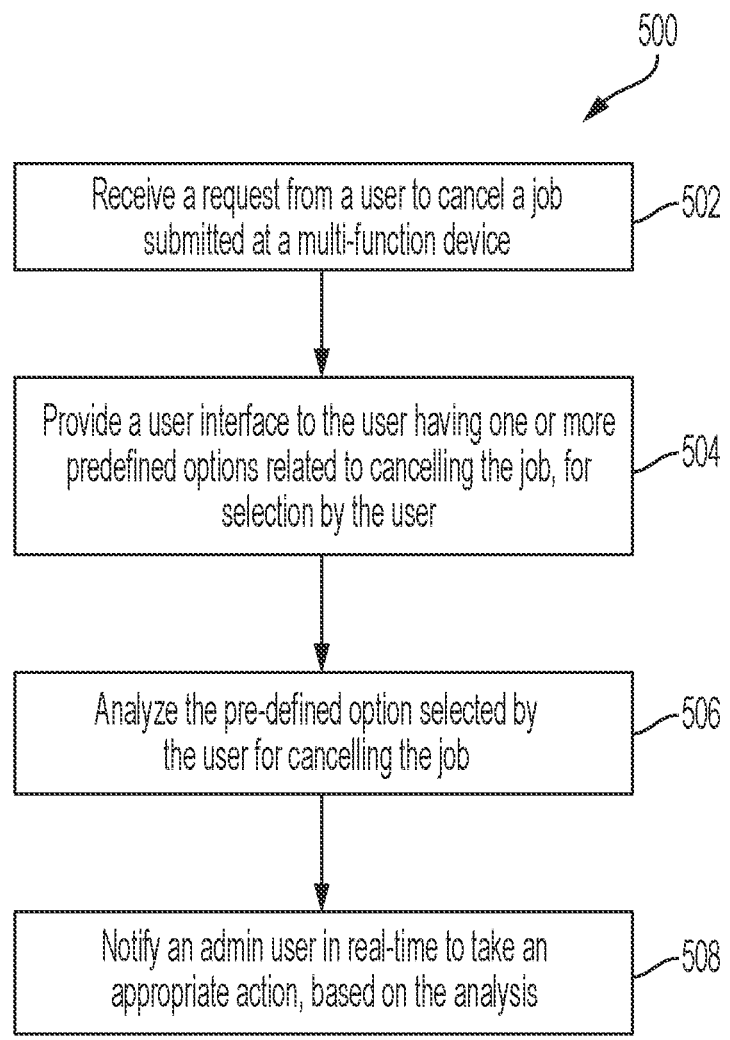
FIG. 5 is a method flowchart for managing cancelled jobs at a multi-function device, in accordance with an embodiment of the present disclosure.

FIG. 5 illustrates an exemplary method 500 for managing one or more cancelled jobs. The method 500 can be implemented at a multi-function device such as the multi-function device 102 of FIG. 1 or 202 of FIG. 2. Alternatively, the method 500 can be implemented at a system (e.g., the system 200 of FIG. 2) where some blocks are implemented at a multi-function device and some blocks are implemented at a cloud server.

The method begins when a user wishes to cancel a job submitted at a multi-function device. Here, the job can be a print job, a scan job, a copy job or a fax job that is submitted at the multi-function device by the user. The job can be either in progress or pending at the time of cancellation and the user wishes to cancel the job for one or more reasons. For example, the user may want to cancel a print job in progress if one or more printed papers have unwanted marks or smudge marks on it lowering the overall quality of the printed papers. The user may cancel a scan job in case wrong set of documents are submitted for scanning. These are a few examples, and the present disclosure can be implemented to cancel a job for various other reasons.

The user raises a request to cancel the job either via a user interface of the multi-function device or via a print driver on his computing device. The request to cancel the job is received at the multi-function device, at 502. Subsequently, a user interface is shown to the user displaying one or more pre-defined options related to cancelling the job, at 504. The user selects one or more pre-defined options via the user interface. The selected pre-defined option indicates a reason to cancel the job. The one or more pre-defined options can be quality related option, non-quality related option, or others option. For example, the quality related options can be smudge marks, unwanted stripes, ghosting, unwanted marks, unwanted dots, poor image quality, jamming of paper, low resolution, insufficient consumables, and so on. The non-quality related options can be wrong document selection, wrong media selection, etc. While the method 500 is discussed for a scenario where the user initiates the cancellation of the job, in some scenarios, the job is automatically cancelled by the multi-function device. For example, a job having unsupported file format is automatically cancelled by the device. Similarly, unauthorized print jobs and jobs for which input files are not detected by the device, the jobs are automatically cancelled by the device. In such cases the user interface provides a message informing the user about the reason of automatic cancellation, and the reason for cancellation is stored for further analysis.

Further, if a desired reason for which the user wishes to cancel the job is not listed in the pre-defined options, the user inputs one or more comments Once the user selects the desired pre-defined option/reason, the reason to cancel the job is automatically stored for analysis. The selected reason can be stored in a memory of the multi-function device in scenarios where the entire disclosure is implemented on the multi-function device alone. However, in another scenario where the disclosure is implemented using a system such as the system 200 of FIG. 2, the selected pre-defined option/reason is stored in a cloud server, such as the cloud server 212 of FIG. 2. The stored pre-defined option/reason is then analyzed at 506. Based on the analysis, an admin user is notified in real-time to take an appropriate action, at 508. For example, the notification can be message shared with the admin user on his computing device such that the message informs the admin about a recurring error in the multi-function device. Based on the notification, the admin user can take an appropriate action such as go and fix the reason/error in the multi-function device, notify the one or more other user about the error in the device so that these users can use some other multi-function device for various requirements/functionalities.

In another example, the admin user can access the cloud server to manually analyze the stored reason(s). He can then analyze the feedback or comments provided by users while cancelling their jobs. Based on his analysis, he can take an action to add a new reason that can be displayed to the user while cancelling their jobs. For example, if a user cancels a job for a new reason such as repeated jamming of sheets, the admin user can update the list of reasons that are displayed to the user while job cancellation. The updated list of pre-defined options can have the new reason 'repeated jamming' that can be selected by new users at the time of job cancellation.

In method 500, the request for cancelling the job from the user can be received from a print driver when the user cancels the job via his computing device. Alternatively, the request can be received directly from the multi-function device when the user cancels the job at the multi-function device itself. In some scenarios, where the user is an admin, the request for cancellation can be received through a web application such as CentreWare Internet Services (CWIS) or other suitable platforms. This typically happens when there is a recurring problem in the multi-function device and the admin makes a setting to automatically cancel any new job that is expected to be cancelled for the same problem. For example, if 5 print jobs are cancelled for repeated jamming of paper, the admin makes a setting to automatically cancel any new print job till the problem of repeated jamming is fixed.

Figure 6:
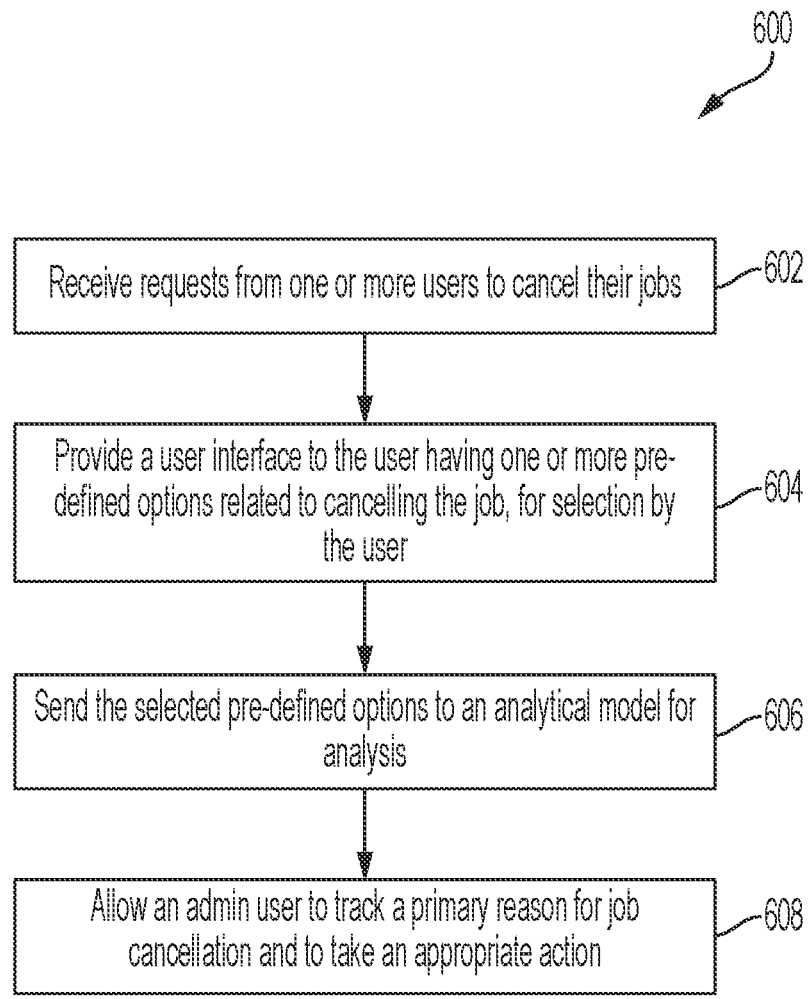
FIG. 6 is another method flowchart for managing cancelled jobs at a multi-function device, in accordance with an embodiment of the present disclosure.

FIG. 6 illustrates an exemplary method 600 for managing one or more cancelled jobs. The method 600 can be implemented at a system (e.g., the system 200 of FIG. 2) where some blocks are implemented at a multi-function device and some blocks are implemented at a cloud server.

The method begins when one or more users cancels their jobs submitted at a multi-function device. Here, the jobs can be a print job, a scan job, a copy job, a fax job, in any combination and the jobs are submitted at the multi-function device (such as multi-function device 202 of FIG. 2) by the user.

The one or more requests to cancel the jobs are received at the multi-function device from one or more users, at 602. Subsequently, a user interface is shown to the one or more users displaying one or more pre-defined options related to cancelling the job, at 604. The one or more users select one or more pre-defined options via the user interface. The selected pre-defined option indicates reason to cancel the jobs. The one or more pre-defined options can be quality related option, non-quality related option, or others option. For example, the quality related options can be smudge marks, unwanted stripes, ghosting, unwanted marks, unwanted dots, poor image quality, jamming of paper, low resolution, insufficient consumables, and so on. The non-quality related options can be wrong document selection, wrong media selection, etc.

Once the user selects the desired pre-defined option/reason, the reason to cancel the job is sent to an analytical model for analysis, at 606. The analytical model can be a database, or a model hosted in a cloud server, such as the cloud server 212 of FIG. 2. Once the reasons selected by one or more users are stored in the analytical model, the model analyze the reasons and allows an admin user to track the reason to take an appropriate action, at 608. For example, the admin user can track how many jobs are cancelled in a day for the same reason and can go and fix the reason on priority. Based on the analysis and tracking of reasons, the admin user can notify the one or more other user about the error in the device so that these users can use some other multi-function device for various requirements/functionalities.

The analytical model can be created based on the respective pre-defined option selected by the one or more users for cancelling their respective jobs at the multi-function device. Also, the analytical model can be updated based on additional requests received from the one or more users and other users for cancelling their jobs at the multi-function device.

The pre-defined options stored in the analytical model can either be automatically analyzed by the model or can be manually analyzed by the admin user. Based on his analysis, he can take an action to add a new reason that can be displayed to the user while cancelling their jobs. For example, if a user cancels a job for a new reason such as repeated jamming of sheets, the admin user can update the list of reasons that are displayed to the user while job cancellation. The updated list of pre-defined options can have the new reason 'repeated jamming' that can be selected by new users at the time of job cancellation.

In the above methods 500 and 600, the cloud server may be a third-party cloud server, or an internal server hosted by an enterprise. The cloud server can be accessed by an admin user from a computing device and/or multi-function device. The cloud server can be a server that is located at the same location at that of the multi-function device. The cloud server can be a database.

The present disclosure provides methods and systems for managing cancelled jobs at a multi-function device. The methods and systems allow an administrator to monitor the multi-function device and the cancellation requests in real-time. The administrator can receive alerts or notification so that an issue or error in the multi-function device can be fixed in least possible time. The methods and systems also alert users in case an error is happening on consistent basis in the multi-function device. This way new users are aware of the persistent errors, which avoids wastage of resources by alerting the new user to not submit their job. The methods and systems also allow the administrator to check the feedbacks received from user for cancelling their jobs, which helps the administrator to manage the usage of multi-function device in an efficient way. The present disclosure leads to good quality printing as any errors can be fixed in real-time by the administrator.

The methods and systems lead to increasing satisfaction of users as their feedback and reasons to cancel jobs is heard in real-time. The methods and systems provide real-time information to both administrator and to the users/customers, and therefore the present disclosure provides a quicker and less intrusive way to users for getting the device-based issues resolved. The disclosure allows a next/new user to save time and money if they need an option that is not working and can be informed ahead of time. The methods and systems also provide an operator/remote service person who can interact with the multi-function device remotely while the user waits. Even if the remote service person cannot fix the multi-function device, the user can have positive interaction with the multi-function device.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, cancelling, analyzing, notifying, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for managing cancelled jobs at a multi-function device, the method comprising:
   receiving a request from a user to cancel a job submitted at the multi-function device;
   based on the request, providing a user interface to the user, comprising one or more pre-defined options related to cancelling the job, for selection by the user, wherein the one or more pre-defined options comprise quality related option and non-quality related option;
   analyzing the pre-defined option selected by the user for cancelling the job;
   based on the analysis, notifying an admin user in real-time to take an appropriate action; and
   adding one or more further options to the one or more pre-defined options, based on the analysis.

2. The method of claim 1, wherein selection of the one or more pre-defined options indicates a reason to cancel the job by the user.

3. The method of claim 1, wherein the quality related option further comprises at least selectable options: smudge marks, unwanted stripes, ghosting, unwanted marks, unwanted dots, jamming of paper, poor image quality, low resolution, and insufficient consumables.

4. The method of claim 1, wherein the non-quality related option further comprises at least selectable options: wrong document selection and wrong media selection.

5. The method of claim 1, further comprising, storing the pre-defined option related to the cancelled job for further analysis.

6. The method of claim 1, further comprising, allowing the user to select the pre-defined option to cancel the job through the user interface.

7. The method of claim 1, further comprising, allowing the user to input one or more comments if the desired option is not listed in the one or more pre-defined options.

8. The method of claim 1, further comprising, notifying one or more other users about the cancelled job at the multi-function device along with a reason.

9. The method of claim 1, wherein the request for cancelling the job from the user is received from one of: a print driver, the multi-function device and other platforms.

10. The method of claim 1, further comprising, receiving one or more requests from one or more users for cancelling their respective jobs at the multi-function device.

11. The method of claim 1, further comprising, automatically cancelling one or more received jobs by the multi-function device.

12. The method of claim 11, wherein the one or more received jobs are automatically cancelled based on at least one of: based on a pre-defined number of cancel requests received from one or more users, based on the analysis, unsupported format, unauthorized job, input file size not detectable and others.

13. The method of claim 11, further comprising, alerting the one or more users about their cancelled jobs at the multi-function device.

14. The method of claim 11, further comprising, automatically sending one or more reasons for cancelling their jobs for further analysis.

15. A multi-function device for managing cancelled jobs, the multi-function device for:
   receiving a request from a user to cancel a job as submitted;
   based on the request, providing a user interface to the user, comprising one or more pre-defined options related to cancelling the job, for selection by the user, wherein the one or more pre-defined options comprise quality related option, non-quality related option and others option;
   analyzing the pre-defined option selected by the user for cancelling the job;

based on the analysis, notifying an admin user in real-time to take an appropriate action; and adding one or more further options to the one or more pre-defined options, based on the analysis.

16. The multi-function device of claim 15, wherein the quality related option further comprises at least selectable options: smudge marks, unwanted stripes, ghosting, unwanted marks, unwanted dots, jamming of paper, poor image quality, low resolution, and insufficient consumables.

17. The multi-function device of claim 15, wherein the non-quality related option further comprises at least selectable options: wrong document selection and wrong media selection.

18. The multi-function device of claim 15 is for, automatically cancelling one or more received jobs from one or more other users at least based on the analysis.

19. The multi-function device of claim 18 is for, alerting the one or more other users about their cancelled jobs by the multi-function device.

\* \* \* \* \*